US 9,384,256 B2

(12) United States Patent
Banerjee et al.

(10) Patent No.: US 9,384,256 B2
(45) Date of Patent: Jul. 5, 2016

(54) REPORTING AND SUMMARIZING METRICS IN SPARSE RELATIONSHIPS ON AN OLTP DATABASE

(71) Applicant: International Business Machines Corporation, Armonk, NY (US)

(72) Inventors: Biswadeep Banerjee, Bangalore (IN); Michael L. Lamb, Leander, TX (US); Mack E. Phelps, Raleigh, NC (US); Vishnukumar T Santharam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 14/477,982

(22) Filed: Sep. 5, 2014

(65) Prior Publication Data

US 2015/0134599 A1  May 14, 2015

Related U.S. Application Data

(63) Continuation of application No. 14/075,195, filed on Nov. 8, 2013.

(51) Int. Cl.
*G06F 17/30* (2006.01)
(52) U.S. Cl.
CPC .... *G06F 17/30592* (2013.01); *G06F 17/30292* (2013.01); *G06F 17/30339* (2013.01); *G06F 17/30424* (2013.01); *G06F 17/30457* (2013.01); *G06F 17/30557* (2013.01)
(58) Field of Classification Search
CPC ............. G06F 17/30292; G06F 17/30339; G06F 17/30457; G06F 17/30592
See application file for complete search history.

(56) References Cited

U.S. PATENT DOCUMENTS

| 7,392,248 | B2 | 6/2008 | Bakalash et al. |
| 7,536,379 | B2 * | 5/2009 | Purcell .............. G06F 17/30457 |
| 7,720,803 | B2 | 5/2010 | Unnebrink et al. |
| 8,219,521 | B2 | 7/2012 | Lavdas et al. |
| 2004/0215626 | A1 * | 10/2004 | Colossi ............. G06F 17/30312 |

(Continued)

FOREIGN PATENT DOCUMENTS

| CA | 2693995 A1 | 1/2009 |
| IN | 2606MUM2009 A | 2/2012 |

OTHER PUBLICATIONS

Ballard, et al., "Dimensional Modeling: In a Business Intelligence Environment", IBM International Technical Support Organization, Redbooks, DB2 Information Management Software, Mar. 2006, Copyright International Business Machines Corporation 2006, ibm.com/redbooks.
Vanleenhove, Maarten, "Best Practices in Modelling IBM Cognos 8 Semantic Layers Cognos 8 BI Stack", Element 61, Monday, Oct. 13, 2008, <http://www.element61.be/e/resourc-detail.asp?ResourceId=7>.
U.S. Appl. No. 14/075,195, entitled "Reporting and Summarizing Metrics in Sparse Relationships on an OLTP Database", filed Nov. 8, 2013.

*Primary Examiner* — Kris Mackes
(74) *Attorney, Agent, or Firm* — David B. Woycechowsky

(57) ABSTRACT

Storing and/or accessing data in a transactional database, with use of the following technique: (i) selecting a set of base tables in a transactional database; and (ii) creating a factless materialized query table, having maximum sparsity, for the set of base tables. The set of base tables includes at least two base tables. The set of base tables includes a set of keys including at least two distinct primary keys. The factless materialized query table includes one record associated with each record in the set of base tables. Each record in the materialized query table includes a value for every primary key in the set of base tables.

6 Claims, 9 Drawing Sheets

(56) References Cited

U.S. PATENT DOCUMENTS

| | | |
|---|---|---|
| 2007/0061287 A1 | 3/2007 | Le et al. |
| 2007/0239508 A1 | 10/2007 | Fazal et al. |
| 2011/0196857 A1 | 8/2011 | Chen et al. |
| 2011/0264618 A1 | 10/2011 | Potdar et al. |
| 2013/0282765 A1 * | 10/2013 | Bhattacharjee ... G06F 17/30292 707/803 |

* cited by examiner

404

| TEAM | NAME | APPLES | RED | GREEN |
|---|---|---|---|---|
| HEARTS | AARON | 15 | 3 | 2 |
| HEARTS | BOB | 15 | 10 | 0 |
| DIAMONDS | MIKE | 7 | 0 | 0 |
| DIAMONDS | NANCY | 7 | 4 | 3 |
| CLUBS | YVETTE | 0 | 0 | 0 |
| CLUBS | ZELDA | 0 | 0 | 0 |

| EYE | YEAR | APPLES | RED | GREEN |
|---|---|---|---|---|
| BLUE | 2012 | 4 | 3 | 1 |
| BLUE | 2013 | 1 | 0 | 1 |
| BROWN | 2012 | 0 | 0 | 0 |
| BROWN | 2013 | 17 | 14 | 3 |

| NAME | EYE COLOR |
|---|---|
| AARON | BLUE |
| BOB | BROWN |
| MIKE | BROWN |
| NANCY | BROWN |
| YVETTE | BLUE |
| ZELDA | BROWN |

| NAME | EYE COLOR | YEAR |
|---|---|---|
| AARON | -2 | -2 |
| BOB | -2 | -2 |
| MIKE | -2 | -2 |
| NANCY | -2 | -2 |
| YVETTE | -2 | -2 |
| ZELDA | -2 | -2 |
| -2 | BLUE | 2012 |
| -2 | BLUE | 2013 |
| -2 | BROWN | 2013 |
| -2 | BROWN | 2013 |
| AARON | BLUE | -2 |
| BOB | BROWN | -2 |
| MIKE | BROWN | -2 |
| NANCY | BROWN | -2 |
| YVETTE | BLUE | -2 |
| ZELDA | BROWN | -2 |

| NAME | EYE COLOR | YEAR | GANULARITY FOR APPLES | GANULARITY FOR RED APPLES |
|---|---|---|---|---|
| AARON | -2 | -2 | PER TEAM | PER TEAM |
| BOB | -2 | -2 | PER TEAM | PER TEAM |
| MIKE | -2 | -2 | PER TEAM | PER TEAM |
| NANCY | -2 | -2 | PER TEAM | PER TEAM |
| YVETTE | -2 | -2 | PER TEAM | PER TEAM |
| ZELDA | -2 | -2 | PER TEAM | PER TEAM |
| -2 | BLUE | 2012 | PER EYE COLOR, PER YEAR | PER EYE COLOR, PER YEAR |
| -2 | BLUE | 2013 | PER EYE COLOR, PER YEAR | PER EYE COLOR, PER YEAR |
| -2 | BROWN | 2013 | PER EYE COLOR, PER YEAR | PER EYE COLOR, PER YEAR |
| -2 | BROWN | 2013 | PER EYE COLOR, PER YEAR | PER EYE COLOR, PER YEAR |
| AARON | BLUE | -2 | -2 | -2 |
| BOB | BROWN | -2 | -2 | -2 |
| MIKE | BROWN | -2 | -2 | -2 |
| NANCY | BROWN | -2 | -2 | -2 |
| YVETTE | BLUE | -2 | -2 | -2 |
| ZELDA | BROWN | -2 | -2 | -2 |

| SERVER | CAPACITY | SYSTEM | CAPACITY | DISK | CAPACITY |
|---|---|---|---|---|---|
| A | 50 | X6000 | 100 | D1 | 20 |
| A | 50 | X6000 | 100 | D2 | 20 |
| A | 50 | X6000 | 100 | D3 | 20 |
| A | 50 | X6000 | 100 | D4 | 20 |
| A | 50 | X6000 | 100 | D5 | 20 |
| TOTALS | 250 | | 500 | | 100 |

FIG. 6

REPORTING AND SUMMARIZING METRICS IN SPARSE RELATIONSHIPS ON AN OLTP DATABASE

FIELD OF THE INVENTION

The present invention relates generally to the field of data warehouse reporting, and more particularly to OLTP databases.

BACKGROUND OF THE INVENTION

A star schema is the simplest style of data mart schema. Its name derives from its shape, with one or more fact tables referencing multiple dimension tables that surround each fact table or set of tables to make up the rays of a "star." A fact table typically holds measurable, quantitative data, while a dimension table holds attributes related to that data. Fact tables are typically designed to a level of uniform detail, referred to as "granularity" or "grain."

Online transaction processing (OLTP) is a class of information systems that facilitate and manage transaction-oriented applications. The term "transaction" collectively includes various types of transactions, such as: (i) transactions in the context of a computer or database; (ii) transactions in the context of business or commercial activity; and (iii) transactions based upon a system's response (usually an immediate response) to user requests. An OLTP system may span multiple networks and multiple companies, and may rely on sophisticated transaction management software, database optimization tactics, and distributed processing for efficient operation. OLTP involves gathering input, processing the input, and updating existing information to reflect that input.

Structured Query Language (SQL) is a special-purpose programming language designed for managing data held in a relational database management system (RDBMS). SQL includes provisions for data insert, query, update, and delete, schema creation and modification, and data access control. It is a standard of the American National Standards Institute (ANSI) and the International Organization for Standards (ISO), though features and compatibility can vary among suppliers.

A materialized view (also referred to herein as a materialized query table, or MQT) is a database object that stores the results of a query. An MQT may have one, or more, of the following characteristics or features: (i) a subset or summary of the data store to which the query was directed (herein sometimes referred to as a "queried database" or "base tables"); (ii) stored in physical and/or logical proximity to the queried database; (iii) updated, from time to time, as the underlying data of the queried database changes. Materialized views are known to be useful in data warehousing scenarios, where frequent queries against the queried database can lead to the inefficiency of repetitive query processing.

Classic data warehouse reporting is based on a dimensional fact model (DFM) design in the form of a star schema, with a central fact table containing numerical measures and satellite dimension tables containing character data related to the fact table's "facts." The dimensions, generally de-normalized structures, are considered best for reporting, because this reduces the number of joins required. However, a classic data warehouse design normally requires extract, transform and load (ETL) processes and generally contains temporal metrics (that is, time-based metrics), but does not contain up-to-date information.

SUMMARY

According to three aspects of the present invention there is a method, computer program product and/or system which performs the following steps (not necessarily in the following order): (i) selecting a set of base tables in a transactional database; and (ii) creating a factless materialized query table, having maximum sparsity, for the set of base tables. The set of base tables includes at least two base tables. The set of base tables includes a set of keys including at least two distinct primary keys. The factless materialized query table includes one record associated with each record in the set of base tables. Each record in the materialized query table includes a value for every primary key in the set of base tables.

BRIEF DESCRIPTION OF THE SEVERAL VIEWS OF THE DRAWINGS

FIG. 4A is a first base table used in an example of operation of the first embodiment computer system;

FIG. 4B is a second base table used in an example of operation of the first embodiment computer system;

FIG. 4C is a third base table used in an example of operation of the first embodiment computer system;

FIG. 5A is an MQT, in an under construction status, as built by the first embodiment computer system;

FIG. 5B is the MQT, in a completed status, as built by the first embodiment computer system;

FIG. 6 is a sample table from a second embodiment computer system;

DETAILED DESCRIPTION

Figure 1:
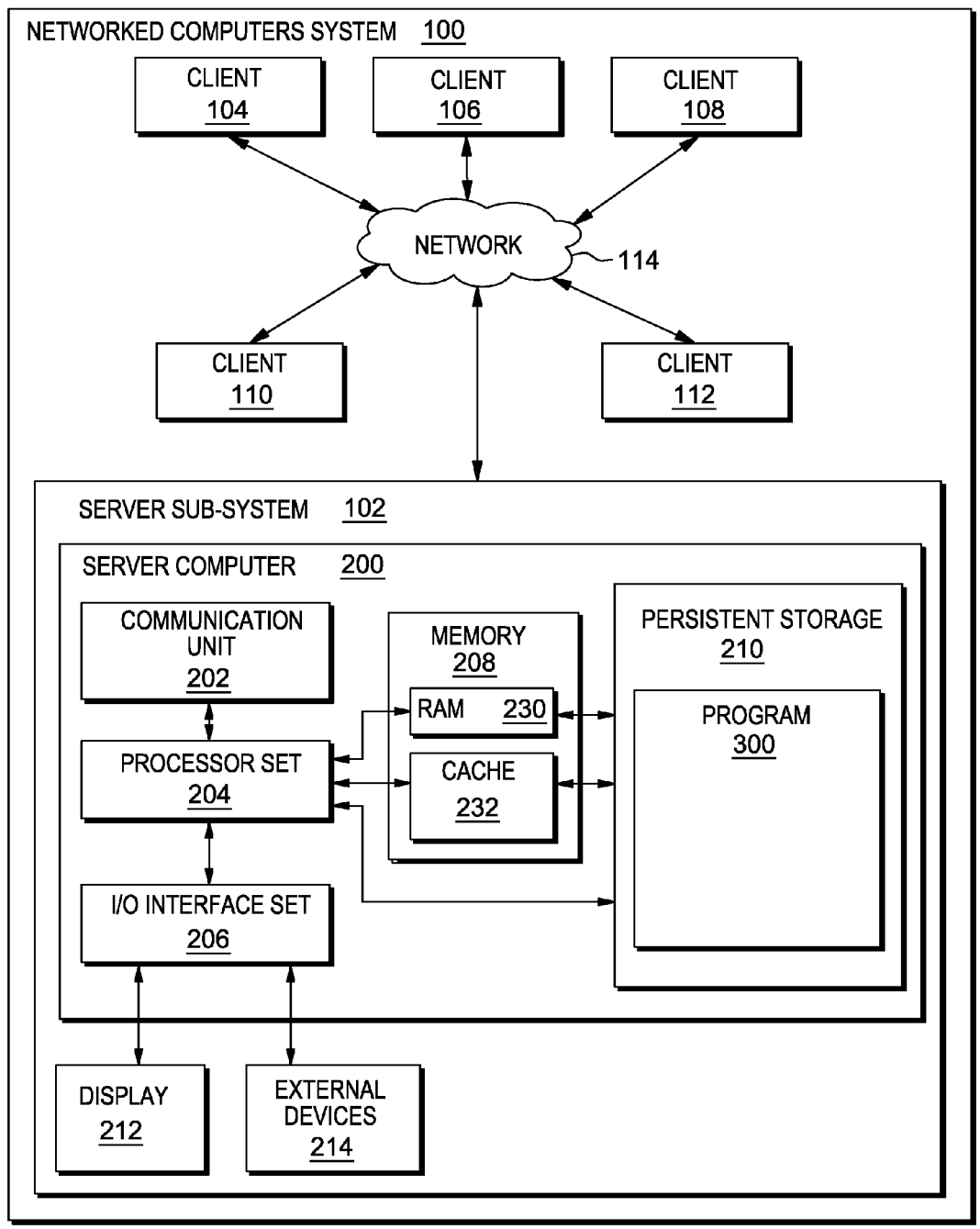
FIG. 1 is a schematic view of a first embodiment of a networked computers system (also sometimes referred to, more simply, as a computer system) according to the present invention.

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 300.

As shown in FIG. 1, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 1, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
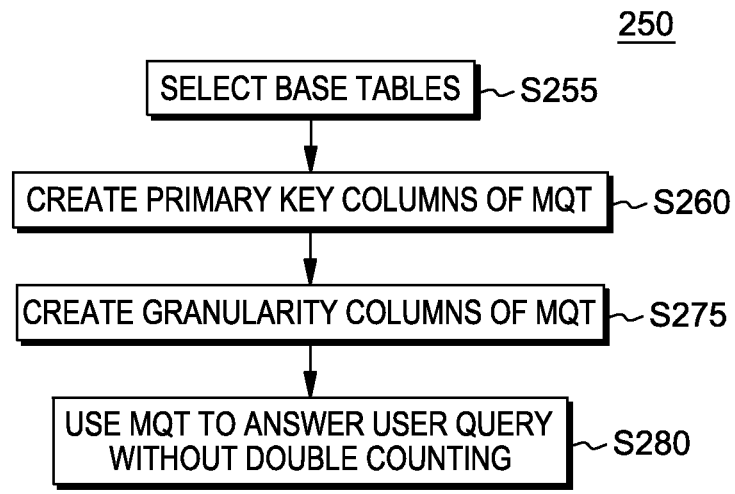
FIG. 2 is a flowchart showing a process performed, at least in part, by the first embodiment computer system.
Figure 3:
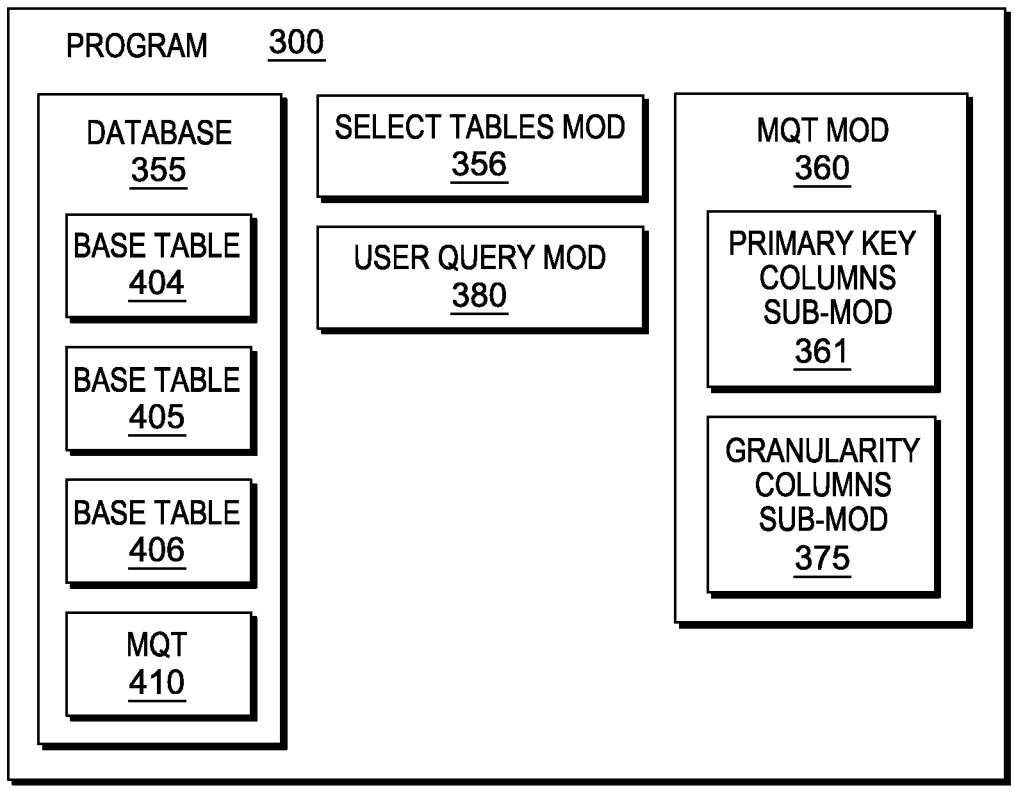
FIG. 3 is a schematic view of a portion of the first embodiment computer system.

FIG. 2 shows a flow chart 250 depicting a method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at S255, where a set of base tables 404, 405, 406 (see FIGS. 4A to 4C) are selected from database 355 by select tables mod 356. Specifically, as shown in FIGS. 4A, 4B, and 4C, respectively, database tables 404, 405 and 406 are selected by mod 356 because they include common dimensions. To explain even more fully: (i) base tables 404 and 405 do not include any common primary key values, so tables 404 and 405 do not include any key-related common dimensions; (ii) base table 406 includes an "EYE COLOR" dimension, which is common with base table 405 (where "EYE COLOR" is a dimension and part of the primary key); (iii) base table 406 includes a "NAME" dimension, which is common with base table 404 (where "NAME" is a dimension and part of the primary key); and (iv) therefore, base tables 404, 405 and 406 are related to each other through common dimension(s). In other embodiments, dimensions may be related by substance even though they share no keys. For example, Table A with a primary key of "State" may be related to Table B having a primary key of "Country" because, even though these primary keys are different, every state is, in this example model, part of a single, determinable country.

The primary key for a base table is the set of values (called key values) of each record of the base table that are used, at a minimum, to uniquely distinguish the respective records apart from each other. In other words, the primary key for each base table is the value, or set of values, needed to uniquely identify a row in that base table. Note that the concept of "primary key" as used herein may sometimes be expressed by other terms, such as "candidate key" or "unique key."

Processing proceeds to step S260, where primary key columns sub-mod 361 of MQT mod 360 begins the process of building MQT 500a, 500b (see FIGS. 5A and 5B) with maximum sparsity based, in part, upon the primary keys, and primary key values, of the selected base tables. This MQT 500a, 500b will include "null flags" for values called for by the MQT which are not present in the base table to which a given MQT record (that is, row) corresponds. More specifically, as best shown in FIGS. 4A, 4B and 4C, the columns (or possible keys) for MQT 500a are: (i) "NAME," because "NAME" is a primary key, or primary key portion, in base tables 404 and 406: (ii) "EYE COLOR" (or, more simply "EYE"), because "EYE" is part of the primary key of base table 405; and (iii) "YEAR," because "YEAR" is a portion of the primary key of base table 405.

Besides selecting the columns for MQT 500a, sub-mod 361 also inserts possible key values, or null flags, as appropriate, into the columns of MQT 500a that correspond to possible key values (that is, the columns "NAME," "EYE" and "YEAR"). As shown in FIG. 5A: (i) rows 2 through 7 of MQT 500a are populated with "NAME" values from respectively corresponding rows 2 through 7 of base table 404 of FIG. 4A; (ii) rows 8 through 11 of MQT 500a are populated with "YEAR" and "EYE" values from respectively corresponding rows 2 through 5 of base table 405 of FIG. 4B; (iii) rows 12 through 17 of MQT 500a are populated with "NAME" and "EYE" values from respectively corresponding rows 2 through 7 of base table 406 of FIG. 4C; and (iv) when a record in one of the base tables does not include a value corresponding to one of the possible key values of MQT 500a, then a null flag (specifically "−2") is assigned at that row-and-column location of MQT 500a.

In this way, step S260 causes MQT 500a to correlate, as comprehensively as possible, the primary keys of selected base tables 404, 405, and 406 into an MQT that joins multiple dimensions of the selected base table set. Because MQT 410 is built in the manner just described, and as will be understood by those of skill in the art, MQT 410 exhibits "maximum sparsity." Because primary key values in base tables tend not to change much (or at all) over time, the possible key values of the first three columns of MQT 500a will usually remain true and correct, even when fact values of the base tables (such as "APPLES EATEN," "RED APPLES EATEN," and "GREEN APPLES EATEN") change in the base tables. The MQT can reliably key into the various base tables, on a relatively long term basis, based on its possible key values reflected in the first three columns of MQT 500a. In fact, some embodiments of the present invention would include only the columns shown in FIG. 500a in the maximum sparsity, multiple-dimension-joining MQT 500a. MQT 500a, 500b exhibits maximum sparsity because every combination of possible key values present in the set of base tables will appear as a separate record in MQT 500a, 500b.

Processing proceeds to step S275, where granularity columns sub-mod 375 adds data granularity values to the fourth and fifth columns of MQT 500b, as shown in FIG. 5B. The fourth column includes granularity values for the fact called "APPLES EATEN" (or, more simply, "APPLES"). The fifth column includes granularity values for the fact called "RED APPLES EATEN" (or, more simply, "RED"). Alternatively, there could be more, or fewer, granularity value columns in MQTs for the various fact(s) that are included in the base tables into which the MQT keys.

The granularity values are added as follows: (i) rows 2 through 7 of column 4 are set to a "per team" granularity value because the "APPLES" column of corresponding base table 404 (see FIG. 4A) is apples eaten per "TEAM;" (ii) rows 2 through 7 of column 5 are set to a "per name" granularity value because the "RED" column of corresponding base table 404 (see FIG. 4A) is red apples eaten per "NAME;" (iii) rows 8 through 11 of column 4 are set to a "per eye color, per year" granularity value because the "APPLES" column of corresponding base table 405 (see FIG. 4B) is apples eaten per "EYE COLOR" and per "YEAR;" (iv) rows 8 through 11 of column 5 are set to a "per eye color, per year" granularity value because the "RED" column of corresponding base table 405 (see FIG. 4B) is red apples eaten per "EYE COLOR" and per "YEAR;" and (v) rows 12 through 17 of columns 4 and 5 are set to null flags because base table 406 (see FIG. 4C) includes neither the fact "APPLES" nor the fact "RED," so there are no applicable granularity values for these facts with respect to base table 406.

Processing proceeds to step S280, where user query mod 380 receives and responds to user queries using MQT 500b and its associated base tables 404, 405 and 406 to: (i) quickly and reliably collect fact data, such as "aggregable" fact data used for counting; and/or (ii) to get granularity values related to the "aggregable fact" in order to provide for more reliable aggregate values (for example, no double counting).

III. Further Comments and/or Embodiments

Some embodiments of the present disclosure recognize that reporting on current, non-temporal data generally requires simulating the classic data warehousing star schema structure based on an online transaction processing (OLTP) database, and that if an OLTP database is complex, then retrieving information in the form of a report or Structured Query Language (SQL) query involves a series of complex joins. This may affect: (i) performance, because SQL query generation becomes more complex with an increasing number of loops; (ii) scalability, because more tables means more joins; and/or (iii) options for users, which may be restricted. "Restricted options for users" means, for example, that the user may not be allowed to relate all elements of the data structure in an ad hoc manner. This limits the data relationships for the users.

Some embodiments of the present disclosure may help deal with one, or more, of the following problems, issues and/or challenges: (i) the dimensions in the dimensional fact model contain sparse data elements (a dimension can often be visualized as a tree structure, with various leaf nodes related hierarchically to the parent; in a sparse tree, elements are missing at various levels of the dimension and the dimension is thus not a regular dimension); (ii) the facts (measures) are related across the various dimensions, which is important in totaling the facts; and (iii) the facts must not be double counted when they share multiple relationships with each other in the reports.

Shown in FIG. 6 is an example of the potential for double counting as seen in table 600. Reports showing the disk capacity for Server A should reflect the correct capacity measure values without double counting. Here, Server A with capacity 50 gigabytes (GB) is connected to storage system X6000 having a capacity of 100 GB made up of 5 disks of 20 GB capacity each. Total disk capacity should therefore sum up 100 GB (20 GB*5), not 500 GB (100 GB*5) nor 250 GB (50 GB*5).

Figure 7:
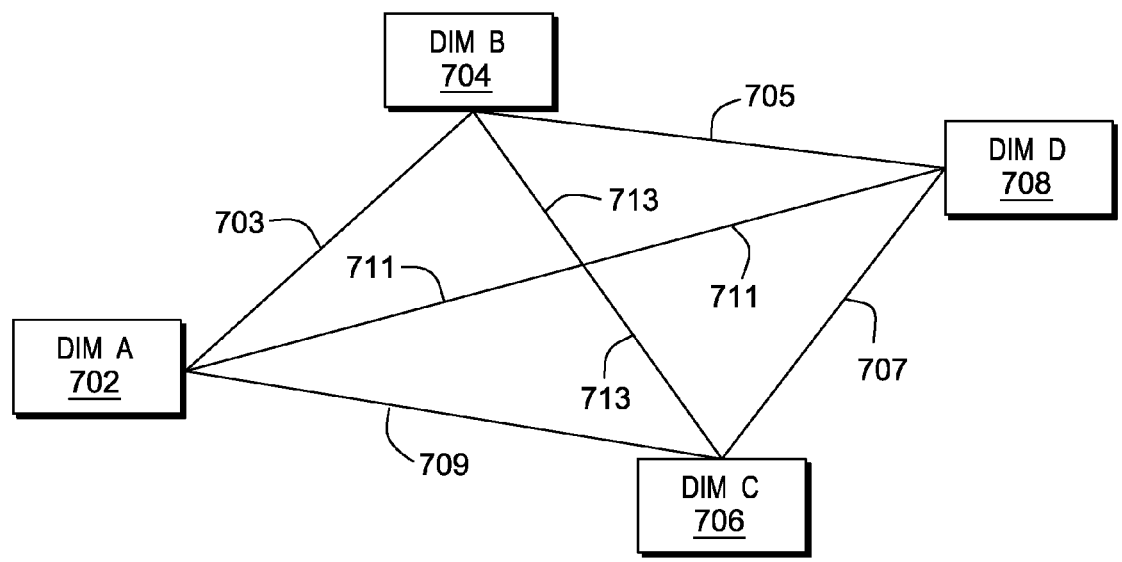
FIG. 7 is a diagram of dimension relationships from a third embodiment computer system.

Shown in FIG. 7 is an example of multiple relationships across facts and/or dimensions. The figure includes dimensions A 702, B 704, C 706, and D 708, and paths 703, 705, 707, 709, 711, and 713 connecting these dimensions. The multiple relationship problem involves scenarios where a dimension or fact is related to other dimensions or facts via multiple paths, and all paths are valid depending upon the specific details of an entry. For example, Dim A 702 is related to Dim B 704, Dim C 706 and Dim D 708 as shown, where Dim B and C are subordinate to Dim A, and Dim D is subordinate to each of Dim A, B and C. Relationship paths from Dim A to Dim D can thus follow any of the following paths: (i) Dim A to Dim D via path 711; (ii) Dim A to Dim B to Dim D via paths 703 and 705; (iii) Dim A to Dim C to Dim D via paths 709 and 707; (iv) Dim A to Dim B to Dim C to Dim D via paths 703, 713, and 707; and (v) Dim A to Dim C to Dim B to Dim D via paths 709, 713, and 705.

Some embodiments of the present disclosure recognize that at least some data warehousing tools (for example, modeling implementations in data modeling tools) generally understand a virtual star schema design, where a fact table joins to multiple dimension tables based on their one-to-many relationships (cardinalities). The table on the nth side of the cardinality is considered a fact, and the table on the other side is considered a dimension. A star schema model with well-defined cardinalities can provide better performance for reporting, because data warehousing tools can typically generate a minimized SQL query for this schema on their own.

Some embodiments of the present disclosure recognize that, typically, tables from an OLTP database are imported into the data warehousing tool and joins are defined. The intent is that the model can then produce reports that show data across different dimensions (though there may be a large number of joins involved for all related tables). To resolve many-to-many relationships between two fact and/or dimension tables, a bridge table (also known by other names, such as factless fact table, junction table, pivot table, join table, map table, and others) can be used, but such a table only stores the direct relationship between the two elements joined. For example, with reference to FIG. 7, a bridge table can be created to store the relationship of Dim A 702 to Dim B 704, or of Dim A to Dim C 706, but a single bridge table will not unambiguously resolve the full, multi-step, multi-path relationship of Dim A to Dim D 708. Loops and double-counting issues can result. Data warehousing tools therefore need a single-path resolution between two such entries to correctly total across their various relationships, but modeling these relationships without materialized query tables can be difficult in cases where there are sparse keys. A "regular dimension" is a dimension that is not a virtual table and whose members are actually made up of rows from the table. Also, a "regular dimension" forms a part of a pure dimension fact or an online analytical processing (OLAP) database that may not be "sparse." An end-to-end example of the implementation (see below) can help to show what is meant by "sparse."

Some embodiments of the present disclosure recognize that the traditional approach outlined above may include one or more of the following drawbacks: (i) complex design: with a complex database, a star schema is difficult to achieve, and would form a mesh-like design, and resolving the joins and loops can be a substantial challenge; (ii) scalability: adding more and more dimensions or tables can add to the complexity of the model; (iii) maintenance of the tables and relationships (joins and cardinalities) can be difficult; (iv) performance: an improper design will not generate a minimized SQL query and will therefore negatively impact performance; and (v) difficulty of showing the correct aggregation total of a measure across dimensions in the report due to the double counting of metrics.

Some embodiments of the present disclosure seek to overcome these drawbacks by using the same tables as both dimension and fact objects in the dimensional fact model. There are basically two main parts of the design implementation in the model, keeping in mind the complexity of the database. First, the complexity of the database is minimized by introducing a layer of materialized query tables (MQTs, also known by other names such as materialized views, indexed views, and snapshots, are database objects that store the results of a query). The MQTs store the primary keys relating back to the tables that make up the dimension, and have a −2 flag (that is, an arbitrary value, suitable for use as a flag) indicating a missing key for values that don't exist. For example, suppose Dimension A has elements a1, a2, and a3, while Dimension B has elements b1, b2, and b3. An MQT can be created to store the relationship of A with a1, a2, and a3, and another MQT can be created to store the relationship of B with b1, b2, and b3. These MQTs are generated from SQL queries written against the OLTP database tables. MQTs should be generated for dimension elements that have some relation to each other. For example, dimension elements that are just attributes don't need to be in the MQT. The MQTs each form a centralized relationship table (like a factless fact having only id columns) that, when surrounded by the database tables as dimensions, form a star schema design. The use of MQTs solves two issues within the model: (i) it minimizes the complexity of the joins and the resultant performance impact; and (ii) it helps address problems with the sparse keys (for example, the occurrence of loops in the model, and double counting of measures).

The second main part of the design implementation in some embodiments of the present disclosure solves double counting of the measures across dimensions. This is done through the use of determinants, which can identify the granularity of data and/or uniquely identify a row of data to ensure double counting is avoided (note: in SQL parlance, determinants generally create a SELECT DISTINCT with a GROUP BY clause based on how the determinants are defined). Since the database tables being normalized here hold both attributes and measure data, fact objects are designed from the MQT layer by using the measure columns with proper determinants defined, so that double counting does not occur. The same tables (that is, the database tables that are involved in creation of the MQT or the fact object) are then imported again with a different name to form dimension objects. With these dimensions and facts, a star design is developed for reporting.

Together, the two design principles outlined above can provide one or more of the following benefits: (i) loops that complicate an original design can be reduced or eliminated by forming pure star schemas; (ii) scalability is improved by allowing any new measure to be added to the fact object and any new attribute to be added to the dimension object; (iii) minimized queries can be generated against the star schemas, enhancing the performance of ad hoc reporting; and (iv) double counting can be avoided and correct summary totals of measures can be produced.

Some embodiments of the present disclosure include a model with four layers: (i) an underlying data layer; (ii) an MQT layer; (iii) a fact layer; and (iv) a dimension layer.

Figure 8:
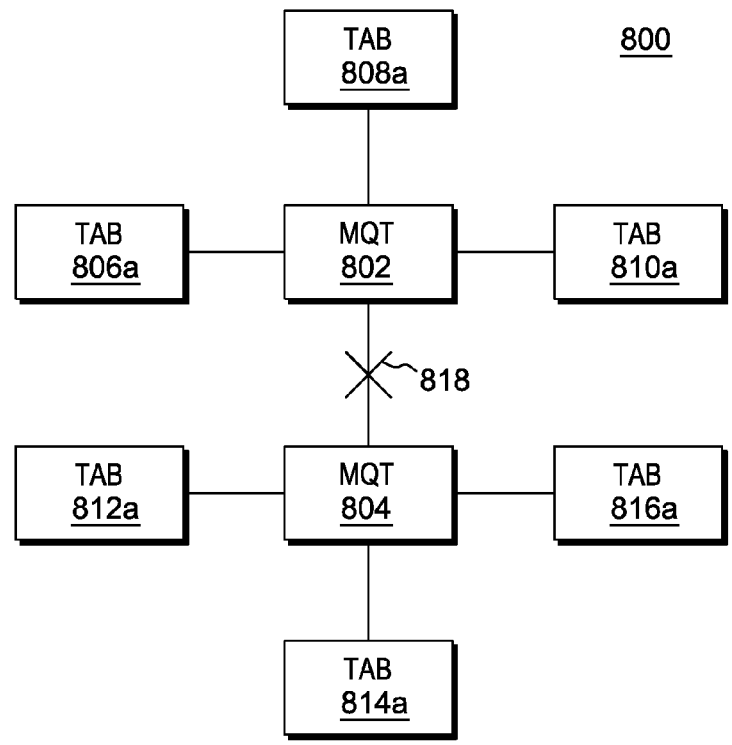
FIG. 8 is a first partial data model from a fourth embodiment computer system.

Shown in FIG. 8 is MQT layer 800, having materialized query tables 802 and 804, as well as underlying data tables 806a, 808a, 810a, 812a, 814a, and 816a. Tables 806a, 808a, and 810a are similar dimensions (for example, elements of dimension A), while tables 812a, 814a, and 816a are similar dimensions (elements of dimension B). MQT 802 is created to store the relationships between members of the first set of tables, while MQT 804 is created to store the relationship between members of the second set of tables. The two sets of underlying database data tables and the two MQTs are then imported into the data warehousing tool and joined to form a star design as shown in the figure. A join is also established between MQT 802 and MQT 804 so that a relation can be created for dimensions of type A and B. In this embodiment, the two MQTs cannot be directly joined since they are different entities, so they are joined using a conformed dimension, indicated by cross (X) mark 818. Whether MQTs are joined in this fashion depends on the business use case. In some cases: (i) two MQTs can be joined together using a SQL full outer join to establish a relationship; (ii) two MQTs can be joined using a conformed dimension to establish a relationship. MQT 802 and MQT 804 now form a factless fact table surrounded by dimension tables.

Figure 9:
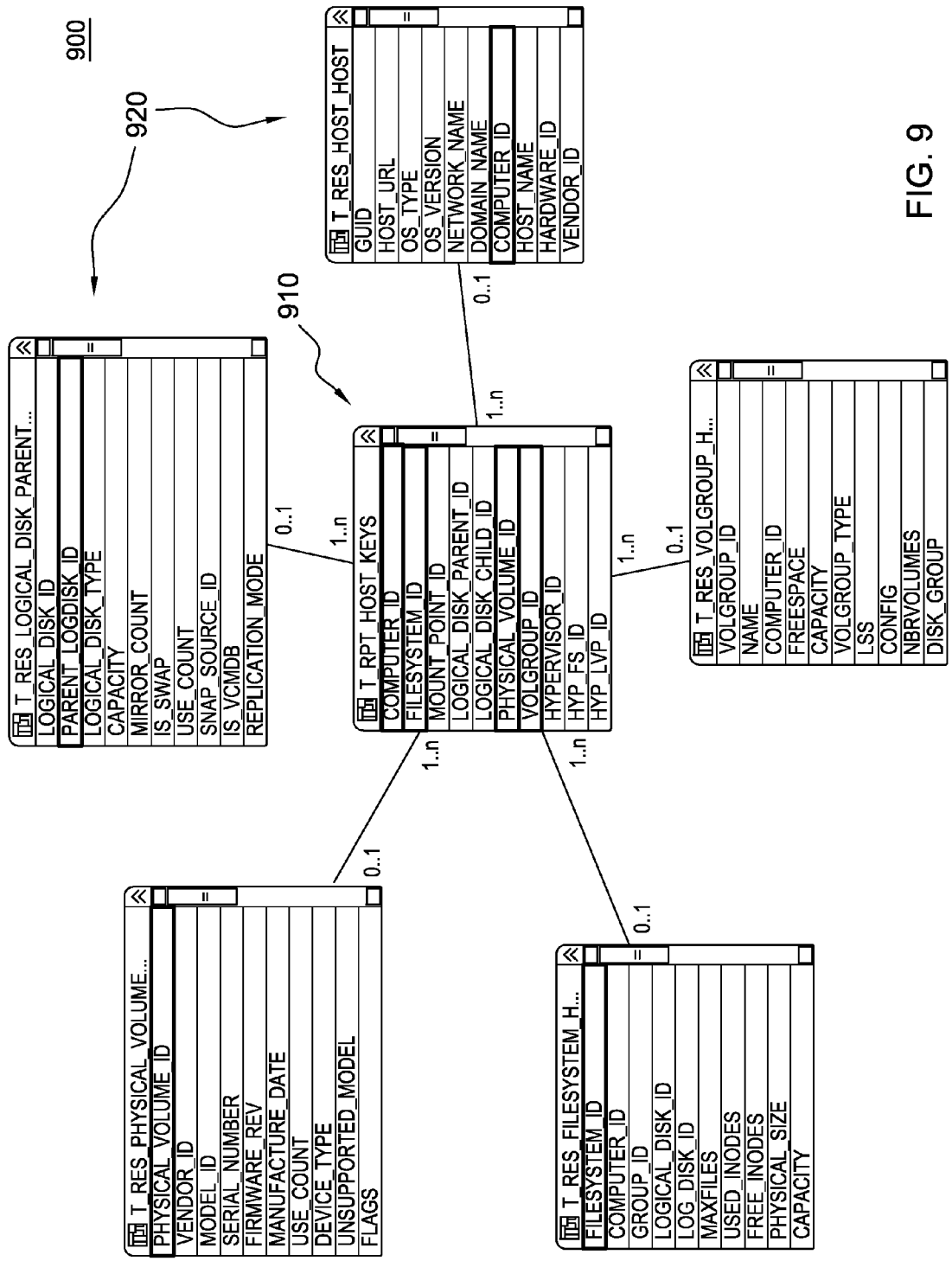
FIG. 9 is a second, more detailed partial data model from a fourth embodiment computer system.

FIG. 9 illustrates this concept in greater detail. As shown in FIG. 9, diagram 900 represents centralized t_rpt_host_keys MQT 910, joined to related dimension tables 920 specific to host elements. These elements include host, logical disk, physical volume, file system, and volume groups.

Figure 10:
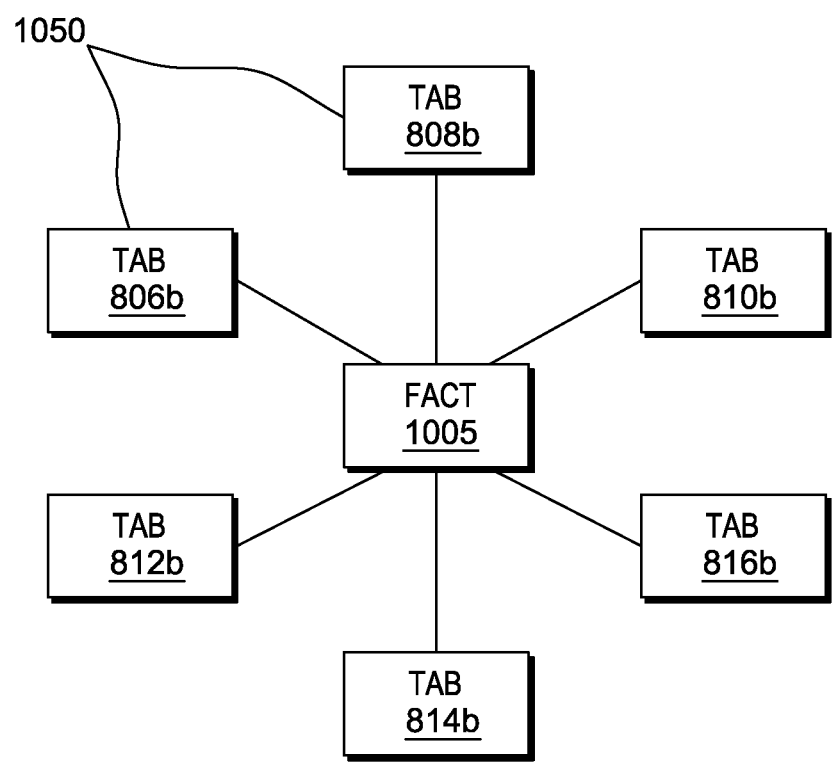
FIG. 10 is a third partial data model from a fourth embodiment computer system.

Shown in FIG. 10 are fact layer object 1005 and dimension layer 1050, where dimension layer 1050 includes tables 806b, 808b, 810b, 812b, 814b, and 816b. The design from MQT layer 800 is used to create another table or a query subject object in the model whose columns are only the id columns and measure columns from all the underlying data tables linked together in MQT layer 800. This table defines fact object 1005. Fact object 1005 contains, for example, columns A1.ID1 and A1.Measure1 from table 806a (see FIG. 8), A2.ID2 and A2.Measure2 from table 808a, and A3.ID3 and A3.Measure3 from table 810a, plus B1.ID1 and B1.Measure1 from table 812a, B2.ID2 and B2.Measure2 from table 814a, and B3.ID3 and B3.Measure3 from table 816a. Determinants are defined for each id level in order to generate distinct queries with proper columns in an SQL GROUP BY clause and avoid double counting.

Dimension layer 1050 is then formed by importing another set of the same original underlying data tables to join with the fact object just created. These tables contribute to the model as dimension objects which provide attribute information. They join to the fact object with a 1 . . . n cardinality. Another star schema is thus formed, which the data warehousing tool uses to efficiently generate SQL queries.

Some embodiments of the present disclosure model an OLTP structured database that contains sparse relationships so a data warehousing tool can generate minimized SQL and not double count the data. A factless keys table, in the form of a materialized query table that has primary keys from the different dimensions, and nulls replaced by −2, is used along with determinants to avoid double counting of measures across various dimensions and their levels. A factless keys table is used as a relationship table that joins multiple dimensions, where the underlying tables are imported from an OLTP database and do not form a pure dimension—fact schema. Moreover, the factless keys table shows maximum sparsity in order to store all combinations of relationships across all dimensions and levels. Such a table bypasses the concept of a typical factless fact and a bridge table. Determinants, which uniquely identify a row and/or the granularity of data, are defined on the centralized fact object, thereby avoiding double counting of the measures.

Some embodiments of the present disclosure aggregate data for sparse dimensions, where a sparse dimension is one in which one or more levels of that dimension are not present for some records.

Some embodiments of the present disclosure can be used in the storage resource management domain. In this domain, there are devices like hosts (or computer systems or servers), storage systems, virtualizers, and their components. In ad hoc reporting, a storage administrator would want to see an end-to-end relationship from a host using the back-end storage of a storage system or virtualizer or a virtualizer either using its local disks or using the back-end storage of a storage system.

Each device in such a system may be made up of one or more components. For example, a host has file systems, disks, volume, and so on. Similarly, a storage system or a virtualizer has components like pools, volumes, disks, managed disks, and the like. Each device and its components are present as tables in a relational database. These tables contain both attributes and measures related to each component. Each table with both attribute and measure data can be used in the model to behave like both a dimension and a fact. The 1 . . . n cardinality defines the way a table should behave—as a dimension object or a fact object. The object on the nth side of the cardinality works as a fact object, and the object on the other side works as a dimension object.

In order to show a relationship of a host connected to a back-end storage device, whether a storage system or a virtualizer, through volumes or pools or disks, the tables need to be joined in a data model. The relational joins in such a case will lead to multiple loops or a mesh in the model.

Sparsity may also be an issue. A storage system may have pools, volumes, disks and managed disks as components. A volume may be created from the disks or managed disks of the storage system while a pool is not created. Alternatively, a pool may be created out of the disks of the storage system while a volume is not created. These are a few simple examples to explain sparsity at the component level for a storage system. Sparsity can also be explained for host to storage system at different levels of the relationship.

In order to get a better star schema design and handle the sparsity in such cases, some embodiments of the present disclosure create a materialized query table (MQT) for each device and its components. The MQTs contain the relationship for all the components specific to each device (for example, keys from a storage system table, keys from a storage virtualizer table, keys from a host). These MQTs become a centralized fact or facts for the device and component tables, forming a star schema.

Using these facts, the id column and measures from each device table are then selected to create a new centralized fact object or objects. The device tables are imported in the model to join to the new fact table(s) and made to behave as dimension objects in the model, again forming a star schema. The fact object(s) only contains id columns and respective measures for each device and its components. In order to avoid double counting for aggregation across devices and components, determinants are defined at every level in the fact object(s) to uniquely identify a row at each level. Efficient queries can then be executed against this model to produce accurate results.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
    selecting a set of base tables in a transactional database; and
    creating a factless materialized query table, having maximum sparsity, for the set of base tables;
    wherein:
    the set of base tables includes at least two base tables;
    the set of base tables includes a set of keys including at least two distinct primary keys;
    the factless materialized query table includes one record associated with each record in the set of base tables; and
    each record in the materialized query table includes a value for every primary key in the set of base tables.

2. The method of claim 1 wherein the transactional database is part of an online transaction processing system.

3. The method of claim 1 wherein:
    in the creation of the materialized query table, a null flag is assigned for every primary key value in every record in the materialized query table where the corresponding record(s) in the set of base tables does not include that primary key.

4. The method of claim 3 wherein:
    in the creation of the materialized query table, each record of the materialized query table is created to include a determinant that uniquely identifies a level of granularity for that materialized query table record.

5. The method of claim 4 further comprising:
    receiving a user query; and
    responding to the user query based, at least in part, upon at least one determinant in the materialized query table.

6. The method of claim 1 wherein:
    the selection of the base tables of the set of base tables causes the MQT created upon the set of selected base tables to join multiple dimensions.

* * * * *